US008706096B2

(12) United States Patent
Cannon et al.

(10) Patent No.: US 8,706,096 B2
(45) Date of Patent: Apr. 22, 2014

(54) CALL MANAGEMENT AND NOTIFICATIONS IN MEDIA PLAYER APPLICATIONS

(75) Inventors: Matthew J. Cannon, Reston, VA (US); Frank E. Figueroa, Broomfield, CO (US); David G. Bell, Broomfield, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

(21) Appl. No.: 13/548,076

(22) Filed: Jul. 12, 2012

(65) Prior Publication Data

US 2014/0018049 A1 Jan. 16, 2014

(51) Int. Cl.
H04M 3/42 (2006.01)

(52) U.S. Cl.
USPC ........ 455/415; 455/412.2; 455/413; 455/567; 379/142.02

(58) Field of Classification Search
USPC ........... 455/415, 413, 414.1, 417, 412.2, 566, 455/567; 379/210.02, 211.01, 142.02
See application file for complete search history.

(56) References Cited

U.S. PATENT DOCUMENTS

| | | | | |
|---|---|---|---|---|
| 5,394,445 | A * | 2/1995 | Ball et al. | 379/88.21 |
| 7,353,035 | B1 * | 4/2008 | Kupsh et al. | 455/466 |
| 7,474,889 | B2 * | 1/2009 | Bhakta et al. | 455/412.2 |
| 7,532,712 | B2 | 5/2009 | Gonder et al. | |
| 7,653,373 | B2 * | 1/2010 | Yamamori | 455/403 |
| 7,668,539 | B2 * | 2/2010 | Mathewson et al. | 455/415 |
| 7,912,194 | B2 * | 3/2011 | Gonder et al. | 379/142.17 |
| 7,974,608 | B2 * | 7/2011 | Chin et al. | 455/415 |
| 8,185,139 | B1 * | 5/2012 | Mangal | 455/466 |
| 8,503,637 | B1 * | 8/2013 | Kirchhoff et al. | 379/142.02 |
| 8,583,094 | B2 * | 11/2013 | Wang | 455/415 |
| 2001/0016485 | A1 * | 8/2001 | Bok | 455/411 |
| 2002/0021790 | A1 * | 2/2002 | Corbett et al. | 379/93.23 |
| 2003/0086432 | A1 * | 5/2003 | Bartfeld et al. | 370/401 |
| 2004/0209601 | A1 * | 10/2004 | Obradovich et al. | 455/414.1 |
| 2005/0141686 | A1 * | 6/2005 | Matsunaga et al. | 379/142.01 |
| 2005/0207557 | A1 * | 9/2005 | Dolan et al. | 379/210.02 |
| 2006/0227957 | A1 * | 10/2006 | Dolan et al. | 379/212.01 |
| 2007/0005789 | A1 * | 1/2007 | Wu | 709/231 |
| 2007/0077920 | A1 * | 4/2007 | Weeks et al. | 455/414.1 |
| 2008/0045186 | A1 * | 2/2008 | Black et al. | 455/413 |
| 2009/0323907 | A1 * | 12/2009 | Gupta et al. | 379/88.13 |
| 2010/0103927 | A1 * | 4/2010 | Bakker | 370/352 |

OTHER PUBLICATIONS http://reviews.cnet.co.uk/mobile-apps/how-to-use-ios-6s-do-not-disturb-feature-50008240/ CNET, "How to use iOS 6's Do not Disturg feature", Jun. 13, 2012.*
http://blogs.blackberry.com/2011/05/blackberry-playbook-tablet-os-v1-0-3-update-%E2%80%93-video-chat-bbm-and-more/ "BlackBerry PlayBook Tablet", May 2011.*

* cited by examiner

Primary Examiner — Sharad Rampuria
(74) Attorney, Agent, or Firm — Chapin IP Law, LLC

(57) ABSTRACT

In accordance with one configuration, a network communication manager identifies an expected duration of time to complete playback of the streaming content. Subsequent to receiving a do not disturb command, the network communication manager prevents visual notifications of future phone calls during the estimated duration of time to provide undisturbed playback of the streaming content on the display screen. Accordingly, embodiments herein support a do not disturb function in which a subscriber can prevent display of visual notifications such as phone call alerts (e.g., pop-up text messages) on the display screen during playback of the streaming content. The do not disturb functionality can be disabled in response to any suitable trigger such as that the subscriber has terminated playback of the streaming content, playback of the streaming content completed, etc.

23 Claims, 11 Drawing Sheets

CALL MANAGEMENT AND NOTIFICATIONS IN MEDIA PLAYER APPLICATIONS

BACKGROUND

Conventional cable networks were originally built to deliver broadcast-quality TV signals to homes. The wide availability of such systems and extremely wide bandwidth of these systems led to the extension of their functionality to include delivery of high-speed broadband data signals to end-users in the home.

Conventional large cable networks comprise distributed video and data facilities. In a typical network, video is distributed to subscribers in geographically segmented markets via a so-called headend that services multiple hubs and nodes. Regional data centers may support multiple headends through separate fiber links. Coordination of subscriber video services and subscriber data services (e.g., e-mail, web browsing, voicemial, VOIP, etc.) is typically required for billing purposes and, increasingly, to provide cross-over services that use both video facilities and data facilities. For example, video equipment such as the so-called set top box (i.e., STB) provide subscribers access to e-mail, web-browsing, and voice services.

Receipt of telephone communication alerts (e.g., ringing of a phone indicating that some one is calling a subscriber) are not always desirable, or may not be desirable at a particular time such as when a subscriber is viewing a television program. For example, a television viewer who is enjoying playback of a selected program on a television often must choose between watching the program or answering an incoming telephone call. A call may simply be ignored, but without some knowledge of the caller, the television viewer who ignores an incoming call is assuming the risk that the call is important. A television viewer with an answering device may elect to have the call answered by the answering device and "screen" the call if the calling party elects to leave a message. However, the cable subscriber cannot be assured that the calling party will leave a message.

Service providers have attempted to deal with the conflict between viewing a television program and answering incoming telephone calls by integrating conventional caller ID services into the set-top box. For example, conventional notification technology has been deployed to enable a subscriber to receive phone call alert notifications and initiate display of caller ID messages on a display screen to provide notification to a subscriber who is calling the subscriber. As a specific example, assume that a user watches a television program. In response to detecting occurrence of a phone call, conventional technology can be used to initiate display of a phone number, and possibly a name associated with the person making the phone call, on a television screen. Accordingly, based on information about the call displayed on the display screen, the subscriber can decide whether to answer or ignore the call.

BRIEF DESCRIPTION OF EMBODIMENTS

Conventional techniques for providing notification of visual notifications of received phone calls suffer from a number of deficiencies. For example, in certain cases, a subscriber may wish to watch a program without being notified of incoming phone calls received during a show. According to conventional systems, each time a person makes a call to the subscriber, a call alert message appears on the display screen, potentially disrupting a viewing of the program. The subscriber may be able to disable the call alert feature via configuration settings. However, this may be time consuming and undesirable as the subscriber typically must stop playback of the program and manually traverse multiple menus to disable a mode of displaying future call alerts. At a later time, if the subscriber would like to reactivate a function of providing visual notifications of phone calls on a television display screen, the subscriber will be further inconvenienced by having to enable the call alert notification mode again by stopping playback of content and manually navigating through the menus again.

Embodiments herein deviate with respect to conventional applications. For example, embodiments herein are directed to unique ways of facilitating management of incoming phone call alerts and/or management of phone calls in a network environment. Note that the following example embodiments can overlap each other.

Embodiment #1

In accordance with one embodiment, a network communication manager controls transmission of streaming content for playback on a display screen. The network communication manager has the ability to initiate display of caller identifier notifications on the display screen during playback of the streaming content on the display screen. For example, assuming that a visual call alert function is currently enabled, upon detecting receipt of an incoming call alert, the network communication manager initiates display of a notification message of the incoming call on the display screen over a rendition of content played back on the display screen.

In one example embodiment, the subscriber may desire to block call notifications from being displayed on the display screen. To this end, the subscriber can select a do not disturb function to temporarily override a current configuration setting to prevent phone call alerts from being displayed on the display screen during playback of one or more shows.

For example, the network communication manager can initiate display of a visual prompt during playback of streaming content on the display screen. The visual prompt can include an indication that a do not disturb function can be selected to prevent display of future call notifications. Assume that the network communication manager receives a command, such as input with respect to the visual prompt, from a subscriber (e.g., user, viewer, etc.) viewing playback of a rendition of the streaming content on the display screen. The command can indicate to block notification of future phone calls that are received during playback of streaming content on the display screen. Subsequent to receiving the command and temporarily setting the network communication manager to a do not disturb mode, assume that the network communication manager receives a notice of an incoming phone call during playback of the streaming content on the display screen. In accordance with the previously received do not disturb command, the network communication manager prevents notification of newly received incoming phone calls on the display screen.

The duration to activate the do not disturb functionality as discussed herein can be derived in any suitable manner.

In accordance with further embodiments, note that the do not disturb function as discussed herein can be activated for a duration of time based at least in part on attributes of streaming content currently being played back on the display screen. For example, the network communication manager can be configured to estimate a duration of time needed to complete, based on one or more possible playback rates, playback of the streaming content. The streaming content may be of a predetermined length. In accordance with a received do not disturb command, by way of a non-limiting example, the network communication manager prevents notification of the future phone calls during the estimated duration of time to provide undisturbed playback of the streaming content on the display screen. Accordingly, embodiments herein support a temporary do not disturb function in which a subscriber can prevent display of visual notifications such as phone call alerts (e.g., pop-up text messages) on the display screen during playback of the streaming content.

In another embodiment, in response to receiving the command, the network communication manager activates the do not disturb functionality as long as the subscriber continues to view the streaming content, regardless of whether the user pauses, rewinds, fast forwards, etc., playback of the streaming content. In response to an event such as that the subscriber terminates viewing of the streaming content, the network communication manager can initiate automatic reactivation of displaying incoming phone call alert messages as notification of new phone calls are received.

In accordance with another embodiment, subsequent to completing playback of the streaming content or expiration of a timer set by the subscriber, the do not disturb functionality can be automatically disabled without further intervention by the subscriber. For example, the do not disturb function as discussed herein can be temporarily activated for a time duration depending on a selection by a subscriber. Reactivation of visual call alert functionality (i.e., disabling of the do not disturb functionality) can occur in response to any suitable trigger such as that the subscriber has terminated playback of the streaming content, playback of the streaming content completed, expiration of a timer, etc.

In addition to or as an alternative to preventing display of a visual notification on the display screen, the network communication manager can prevent a resource such as a subscriber's phone device (e.g., a cellular phone, land-line phone, etc.) from generating an audible and/or visual alert during playback of the streaming content on the display screen. The phone device can be disparately located with respect to the display screen. In other words, the phone device and the display screen can be two different operational devices at two different respective locations (but possibly located near each other). An incoming call can be automatically forwarded to voicemail while in the do not disturb mode.

While the do not disturb functionality is temporarily activated, the network communication manager can be configured to store log information indicating occurrence of one or more phone calls received during playback of the streaming content. The log information can include, for each blocked call alert notification, information such as a unique name of a caller, callback information of a caller initiating the phone call, a phone number on which the call was received, etc.

In response to detecting a trigger condition such as termination of playing back the streaming content on the display screen, the network communication manager can be configured to initiate display of a visual notification on the display screen to notify a subscriber about availability of the log information. The subscriber can input one or more command to view the log information.

In response to receiving a command from the viewer to display the log information, the network communication manager initiates display of the log information on the display screen. In one embodiment, the displayed log information includes unique identifier information associated with a party initiating a respective phone call. Accordingly, after playback of streaming content, a subscriber can be apprised of call notifications that were blocked during the playback of the streaming content.

In accordance with yet further embodiments, in response to detecting termination of playing back the streaming content on the display screen, the network communication manager can be configured to automatically initiate display of the log information on the display screen for viewing by the subscriber as opposed to requiring the subscriber to provide further input to view the log information. The subscriber can provide further input to terminate display of the log information.

As discussed herein, the network communication manager can provide a notification that the do not disturb functionality can be activated to block call alert notifications depending on any of one or more circumstances. For example, prior to receiving a command from a subscriber to activate the do not disturb functionality, the network communication manager can be configured to initiate playback of the streaming content on the display screen for viewing by a user. While the do not disturb functionality is deactivated, the network communication manager can receive notification of an incoming phone call. Because the do not disturb functionality is deactivated, during playback of the streaming content, the network communication manager initiates display of a visual message on the display screen to notify the user of the incoming phone call. In addition to indicating the current incoming phone call, the visual message on the display screen can indicate that notification of future phone calls can be blocked from being displayed on the display screen via activation of the do not disturb functionality. In one embodiment, the visual message is a visual prompt overlaid on at least a portion of a rendition of the streaming content being played back on the display screen. The visual prompt can include a query or notification indicating that a viewer can temporarily block notification of the future phone calls. Via input with respect to the visual prompt on the display screen, the viewer can activate do not disturb functionality for the duration of the streaming content currently played back on the display screen as discussed herein.

Embodiment #2

In accordance with yet further embodiments, a network communication manager can receive a command to block display of visual notifications indicating occurrence of received phone calls during a session of playing back content. A received command can indicate to at least temporarily disable call alert notifications during playback of the content. The network communication manager can be configured to identify attributes of streaming content currently being played back on the display screen to which the command pertains. In one embodiment, the network communication manager estimates an amount of time expected to complete playback of the streaming content on the display screen. The network communication manager prevents display of subsequent visual call alert notifications on the display screen based at least in part on the estimated duration of time. Accordingly, the viewer is not disturbed via playback of the content.

As previously mentioned, the duration in which to temporarily activate the do not disturb functionality can be based on other input such as a subscriber setting a timer.

In a similar manner as discussed above, the network communication manager can receive call handling control commands from a user viewing playback of the streaming content on the display screen. For example, in one embodiment, the user inputs the command based on selection of an option displayed on the display screen during playback of the streaming content. In other words, the network communication manager can initiate display of a message on the display screen indicating that a viewer can activate do not disturb functionality to prevent further notifications of subsequently received calls. As mentioned, the network communication manager can prevent a phone device (a separate device than the display screen) from generating an audible alert when the do not disturb functionality is activated.

The network communication manager can estimate the duration of time associated with the streaming content in a number of different ways. For example, in one embodiment, the network communication manager accesses a television program guide to determine an expected end time of playing back the streaming content. The network communication manager utilizes the television program guide at least in part as a basis in which to estimate the amount of time to complete playback of the streaming content on the display screen.

In accordance with another embodiment, in lieu of using the television program guide to activate a do not disturb mode, the network communication manager can analyze metadata associated with the streaming content. The metadata can include information indicating an expected time needed to playback the content. Based on the metadata, and a current playback point in the streaming content, the network communication manager can identify an amount of time anticipated to complete playback of the streaming content on the display screen.

As previously mentioned, the network communication manager can be configured to store log information indicating the occurrence of the received phone calls during the playback of the streaming content on the display screen. In response to a trigger condition such as detecting termination of playing back the streaming content on the display screen, the network communication manager initiates display of a visual notification on the display screen to notify a viewer regarding availability of the log information to view details of the received phone calls.

Embodiment #3

In accordance with yet another embodiment, the network communication manager can detect occurrence of a phone call during playback of streaming content on a display screen. In such an instance, the network communication manager initiates, during the playback of the streaming content on the display screen, display of a visual notification of the phone call and at least one call handling option on the display screen. Assume that the network communication manager receives a command from a viewer viewing the streaming content played back on the display screen. The command may be selected from the at least one call handling option and indicate how to handle the phone call and/or future calls. In one embodiment, the network communication manager handles the phone call in accordance with the received command. Accordingly, via input with respect to a call handling option simultaneously displayed along with a rendition of streaming content on the display screen, a subscriber can notify a network communication manager how to handle one or more phone calls and/or phone call alerts.

In a more specific instance, in response to detecting occurrence of a phone call during display of the streaming content, the network communication manager initiates display of or overlays a call forwarding option notification message on the display screen during playback of the streaming content on the display screen. The command inputted by a viewer can be a selection of the one or more call forwarding options displayed on the display screen. Selection of the call forwarding option can indicate to forward the phone call to voice mail and terminate generation of an audio alert signal associated with the phone call. In such an embodiment, in response to receiving selection of the call forwarding option by a viewer, the network communication manager forwards the incoming phone call to voice mail and terminates generation of an audio alert signal associated with the phone call. Accordingly, a subscriber can manage incoming calls via input with respect to visual prompts simultaneously displayed on a display screen along with concurrently displayed streaming content.

In accordance with another embodiment, in response to detecting occurrence of the incoming phone call, the network communication manager can be configured to initiate display of a call reject option on the display screen during playback of the streaming content on the display screen. The subscriber can select the call reject option to initiate termination of the phone call. In response to detecting selection of the call reject option by a viewer, the network communication manager initiates termination of the currently received call. Termination of the call can include initiating playback of a message to the caller that the callee (e.g., subscriber) is not accepting calls at this time. In accordance with another embodiment, the network communication manager inputs the caller into a blacklist to prevent future receipt of calls from the caller.

In accordance with yet another embodiment, in response to detecting occurrence of an incoming phone call, the network communication manager can initiate display of a cancel or ignore option on the display screen during playback of the streaming content on the display screen. The subscriber can select the call cancel option to perform no action with respect to the incoming phone call. As an example, selection of the displayed cancel option can indicate to discontinue displaying the visual notification of the incoming phone call and perform no specific call handling function.

In accordance with yet another embodiment, in response to detecting occurrence of a phone call, the network communication manager can initiate display of a call forwarding option on the display screen during playback of the streaming content. The subscriber can select the call forwarding option. The selected call forwarding option can indicate a specific phone number in which to forward the incoming call. Thus, via input with respect to the display screen, the subscriber is able to forward incoming calls to one or more different phone numbers as specified by the subscriber through the display screen (e.g., a disparate device with respect to the phone device to which the incoming call is originally directed).

These and other more specific embodiments are disclosed in more detail below.

Note that embodiments herein can include a configuration of one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device, program and/or cause the processor to perform the operations disclosed herein. Such arrangements are typically provided as software, code, instructions, and/or other data (e.g., data structures) arranged or encoded on a non-transitory computer readable storage medium such (i.e., hardware storage media) as an optical medium (e.g., CD-ROM), floppy disk, hard disk, memory stick, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

For example, one embodiment includes a computer readable storage medium or computer readable hardware medium having instructions stored thereon to facilitate notification and/or management of phone calls received during playback of content on a display screen. The instructions, when executed by a processor of a respective computer device, cause the processor or multiple processors to: receive a command to temporarily block notification of future phone calls received during playback of streaming content on a display screen; subsequent to receiving the command, receiving notice of a phone call during playback of the content on the display screen; and prevent notification of the received phone call on the display screen in accordance with the command.

Yet another embodiments herein includes a computer readable storage medium having instructions stored thereon to facilitate notification and/or management of phone calls received during playback of content on a display screen. The instructions, when executed by a processor of a respective computer device, cause the processor or multiple processors to: receiving a command to block display of visual notifications indicating occurrence of subsequent received phone calls; identifying streaming content currently being played back on a display screen to which the command pertains; calculating an amount of time based at least in part on attributes of the streaming content played back on the display screen; and preventing display of the visual notifications on the display screen for the amount of time.

Yet another embodiments herein includes a computer readable storage medium having instructions stored thereon to facilitate notification and/or management of phone calls received during playback of content on a display screen. The instructions, when executed by a processor of a respective computer device, cause the processor or multiple processors to: detect occurrence of a phone call during playback of streaming content on a display screen; initiate, during the playback of the streaming content on the display screen, display of a visual notification of the phone call and at least one call handling option on the display screen; receive a command from a viewer viewing the streaming content played back on the display screen, the command selected from the at least one call handling option, the command indicating how to handle the phone call; and handle the phone call in accordance with the received command.

The ordering of the steps above has been added for clarity sake. These steps can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for use in applications such as installation management of one or more base stations in a wireless network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations, elements, aspects, etc.) of the invention(s), the reader is directed to the textual Detailed Description section and corresponding figures of the present disclosure as further discussed below. Thus, the following Detailed Description, in addition to providing an intricate description of details of the invention, also provides a further summary of aspects of the invention or inventions.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Figure 1:
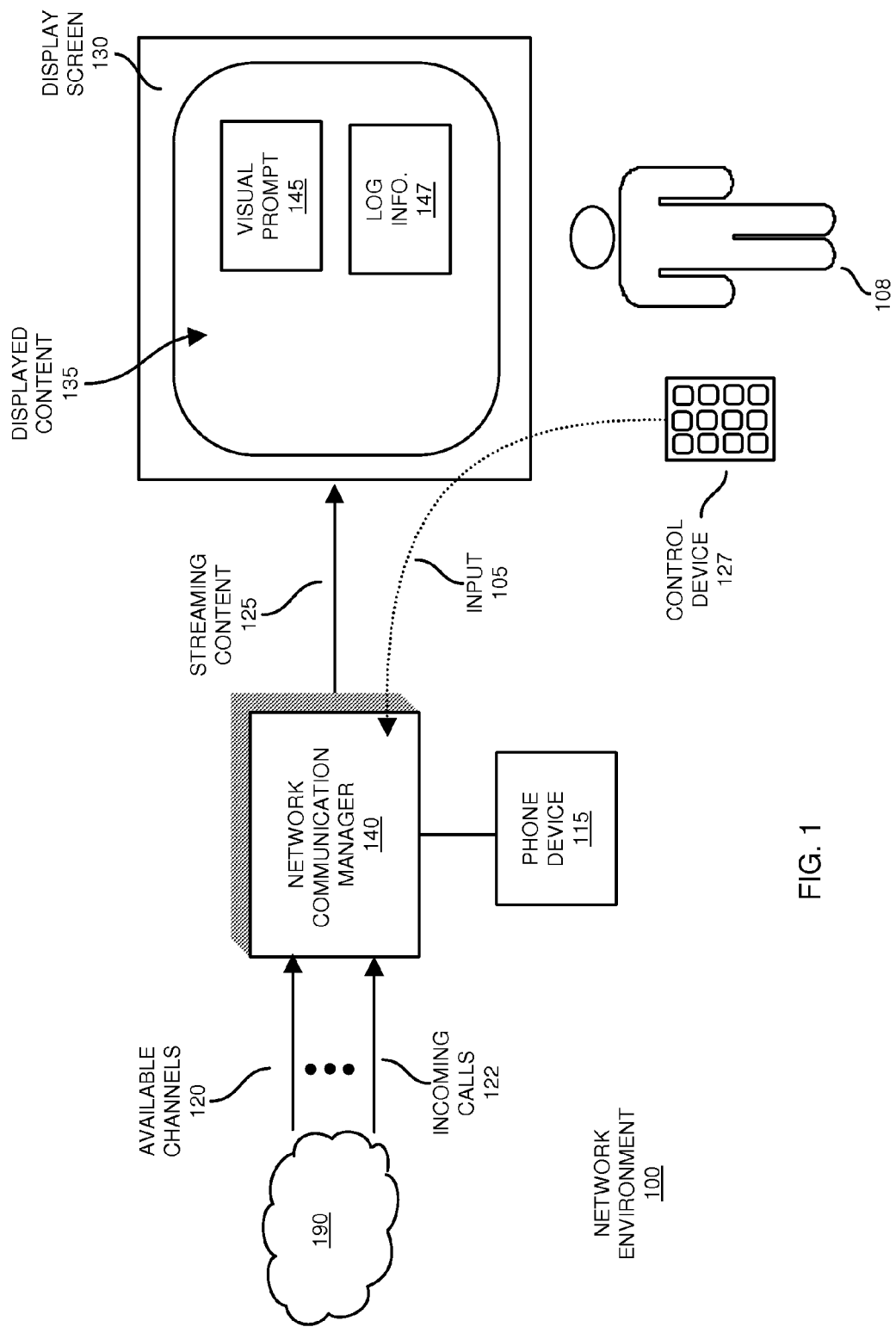
FIG. 1 is an example diagram of a network environment including a network communication manager according to embodiments herein.

More specifically, FIG. 1 is an example diagram illustrating a network environment associated with according to embodiments herein.

As shown, network environment 100 includes a network 190, network communication manager 140, phone device 115, display screen 130, computer device 125 and a subscriber 108 (i.e., a user, viewer, etc.).

Network 190 can be or include any type of communication networks supporting communications such as phone calls, internet access, cable television, distribution of streaming content, etc.

Also as shown, network communication manager 140 has access to multiple channels 120 available from network 190. Based on input 105 from a respective user 108 via control device 127, the user 108 selects streaming content 125 for playback and for respective viewing on display screen 130.

By way of a non-limiting example, streaming content 125 can be video data, scheduled television programs, on-demand video, audio data, a slide show, images, etc., played back on the display screen (i.e., a playback device). Control device 127 can be a hard-wired or wireless device including one or more keypads that are selectively depressed by the user 108 to select different operational modes and playback of selected content on the display screen 130.

In addition to controlling the content that is streamed for playback on the display screen 130, the network communication manager 140 can include one or more links with network 190 on which to receive incoming calls from callers that desire to communicate with the user 108.

Accordingly, in one embodiment, the user 108 is able to view playback of streaming content (e.g., as displayed content 135) on the display screen 130 as well as receive phone calls on phone device 115.

The network communication manager 140 can be configured to initiate display of a respective visual notification on the display screen 130 to notify the user 108 of a respective party currently placing a call to the phone device 115. For example, upon detecting receipt of an incoming call alert (e.g., detecting a ring tone of a phone call), and assuming that a visual call alert function is currently enabled by the network communication manager 140, the network communication manager 140 initiates display of a notification message such as visual prompt 145 of the incoming call on the display screen 130. The visual prompt 145 can be displayed over a rendition of streaming content 125 currently played back on the display screen 130.

A subscriber may wish to view playback of the streaming content 125 without being notified of one or more incoming phone calls. According to conventional systems, each time a person makes a call to the user 108, the network communication manager can initiate display of a respective call alert message on the display screen 130, potentially disrupting a viewing of the streaming content 130. The subscriber may be able to disable the call alert feature via configuration settings. However, this may be time consuming and undesirable as the subscriber 108 typically must stop playback of the program and access multiple menus to disable a mode of displaying future call alerts. At a later time, if the subscriber would like to reactivate a function of providing visual notifications of phone calls on a television display screen, the subscriber will be further inconvenienced by having to activate the call alert notification mode again by stopping playback of content and accessing the menus again.

In one example embodiment, the user 108 may desire to temporarily block call notifications from being displayed on the display screen 130. To achieve this end, the user 108 can select a so-called do not disturb function displayed on the display screen 130 to temporarily override a current configuration setting of the network communication manager 140 and prevent phone call alerts from being displayed on the display screen 130 during playback of content.

More specifically, in one embodiment, the network communication manager 140 initiates display of a visual prompt 145 during playback of streaming content 125 on the display screen 130. The visual prompt 145 can include an indication that a do not disturb function can be selected to terminate display of a notification of a currently received call or prevent display of one or more future call notifications. Additionally, the visual prompt 145 can be displayed in response to receiving a phone call and can indicate the occurrence of the currently received phone call.

Assume in this example that the network communication manager 140 receives, from user 108 viewing playback of streaming content 125 on the display screen 130, a command such as input 105 with respect to the visual prompt 145. The command can indicate to at least temporarily block notification of future phone calls that are received during playback of the streaming content 125 on the display screen 130.

Subsequent to receiving the command and temporarily setting the network communication manager 140 to a do not disturb mode, assume that the network communication manager 140 receives a subsequent notice of a phone call during playback of the streaming content 125 on the display screen 130. In accordance with the received do not disturb command (e.g., via input 105 transmitted by control device 125), the network communication manager 140 at least temporarily prevents notification of newly received phone call on the display screen 130. In this way, the network communication manager 140 can prevent display of a respective phone call notification while a do not disturb mode is activated.

The do not disturb function can be activated in any of multiple different ways and any suitable duration until occurrence of a trigger event terminating the do not disturb mode.

For example, in accordance one embodiment, the user 108 can manually select an amount of time in which to temporarily activate the do not disturb functionality.

In accordance with another embodiment, note that the do not disturb function as discussed herein can be activated for a duration of time based at least in part on attributes of the streaming content 125 currently being played back on the display screen 130. More specifically, the network communication manager 140 can be configured to estimate a duration of time needed to complete, based on one or more possible playback rates, playback of the streaming content 125. The streaming content 125 may be of a predetermined length. In such an embodiment, the network communication manager 140 prevents notification of the future phone calls during the estimated duration of time to provide undisturbed playback of the streaming content 125 on the display screen 130. Accordingly, embodiments herein support a do not disturb function in which a subscriber can temporarily prevent display of visual notifications or visual prompts 145 such as phone call alerts (e.g., pop-up text messages) on the display screen during playback of the streaming content 125.

In accordance with yet another embodiment, in response to receiving the input 105 such as a command produced by the user 108 pressing one or more of keypads on the control device 127, the network communication manager activates the do not disturb functionality as long as the subscriber continues to view the streaming content, regardless of whether the user pauses, rewinds, fast forwards, etc., playback of the streaming content. In response to a trigger event such as that the subscriber terminates viewing of the streaming content 125, the network communication manager 140 can initiate automatic reactivation of displaying incoming phone call alert messages (e.g., as one or more visual prompts 145) as new phone calls are received.

Subsequent to completing playback of the streaming content 125 or expiration of a timer set by the user 108, the do not disturb functionality can be automatically disabled without further intervention by the user 108. For example, the do not disturb function as discussed herein can be activated for a time duration depending on a selection by a subscriber. The network communication manager 140 automatically initiates reactivation of visual call alert functionality (i.e., disabling of the do not disturb functionality) in response to any suitable trigger such as that the subscriber has terminated playback of the streaming content, playback of the streaming content completed, expiration of a timer, etc. Accordingly, a user 108 can be informed of the do not disturb functionality as well as select the do not disturb functionality to temporarily prevent display of call alert notifications on the display screen 130.

In addition to or as an alternative to preventing display of a visual notification on the display screen 130, the network communication manager 130 can be configured to prevent a resource such as a subscriber's phone device 115 (e.g., a cellular phone, land-line phone, etc.) from generating an audible alert during playback of the streaming content on the display screen when the do not disturb is activated. The phone device 115 can be disparately located with respect to the display screen 130. That is, as shown, the phone device 115 and the display screen 130 can be two different operational devices. An incoming call received from network 190 can be automatically forwarded to voicemail while in the do not disturb mode is activated. Accordingly, the network communication manager 140 can prevent activation of a ringer on the phone device 115 during activation of the do not disturb mode.

Additionally, while the do not disturb functionality is temporarily activated, the network communication manager 140 can be configured to store log information indicating occurrence of one or more phone calls 122 received during playback of the streaming content 125. The log information can include, for each blocked call alert notification, information such as a unique name of a caller, callback information of a caller initiating the phone call, a phone number on which the call was received, etc.

In one embodiment, in response to detecting a trigger condition such as termination of playing back the streaming content 125 on the display screen 130, the network communication manager 140 initiates display of a visual notification on the display screen to notify a user 108 that the log information 147 is available for viewing. The user can input one or more commands to view the log information 147 on display screen 130.

In accordance with another embodiment, in response to receiving a command from the user 108 to display the log information, the network communication manager 140 initiates display of the log information on the display screen 130. The displayed log information can include unique identifier information associated with each party initiating a respective phone call while the do not disturb mode was activated. Accordingly, after playback of streaming content 130, expiry of a timer, etc., a user 108 can be apprised of call notifications that were blocked during the playback of the streaming content 125.

Note that in accordance with yet further embodiments, in response to detecting a triggering condition such as termination of playing back the streaming content 125 on the display screen 130, the network communication manager 140 can be configured to automatically initiate display of the log information 147 on the display screen 130 for viewing by the user 108 as opposed to requiring the subscriber to provide further input to view the log information. The user 108 can provide further input to terminate display of the caller log information.

Figure 2:
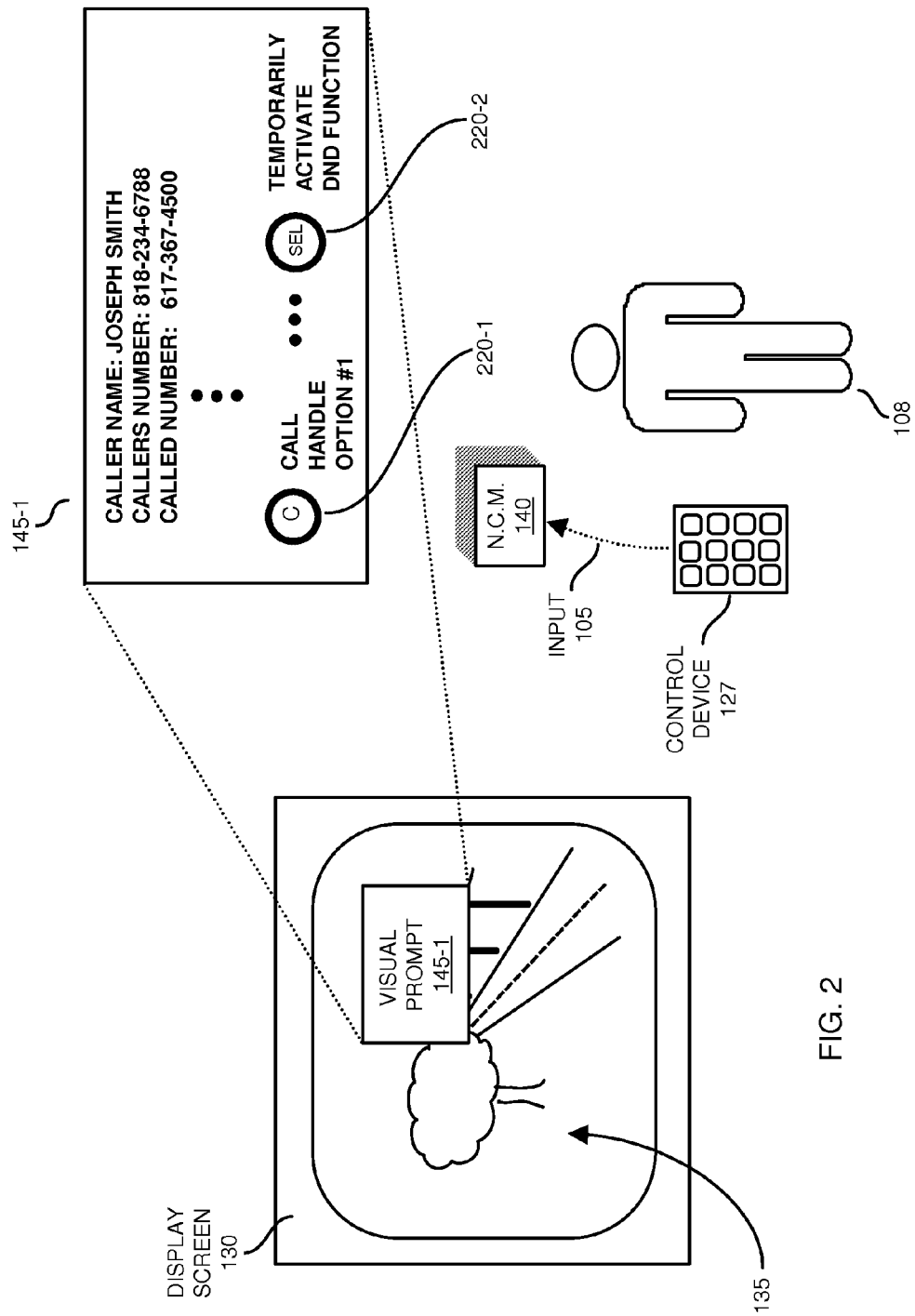
FIG. 2 is an example diagram illustrating display of a visual prompt according to embodiments herein.

FIG. 2 is an example diagram illustrating display of a visual prompt according to embodiments herein.

As shown, assume in this example that a caller initiates a call to phone device 115 operated by the user 108. In response to detecting the incoming call, the network communication manager 140 initiates display of visual prompt 145-1 on the display screen 130. As mentioned, the network communication manager 140 can overlay the visual prompt 145-1 on a rendition of the streaming content 125 currently displayed on the display screen 130. Accordingly, a respective user 108 can be apprised of the call via the visual prompt 145-1.

The visual prompt can include any type of call information such as a name (e.g., Joseph Smith) of the caller, the number (e.g., 818-234-6788) of the device used by to make the call to the user 108, the phone number (e.g., 617-367-4500) called by the caller, etc. Accordingly, the user 108 can be apprised of specific details associated with the current call via display of the visual prompt 145-1.

As further shown, the visual prompt 145-1 can include a notification of different types of selectable options that can be applied to the current phone call. For example, the visual prompt 145-1 can indicate that one or more call handling options such as CALL HANDLING OPTION #1, etc., can be selected and applied to handle the incoming call.

Each of the call handling options can include a symbol (e.g., text, number, etc.) indicating what keypad or keypads should be depressed on the control device 115 to select the respective call handling option. By way of a non-limiting example, the letter "c" can indicate to select a corresponding button on the control device 127 to select control option 220-1 (e.g., call handling option #1), the sequence of letters "sel" can indicate to select a corresponding button on the control device 127 to select control option 220-2 (e.g., do not disturb functionality), and so on.

In an example embodiment, in response to detecting occurrence of the incoming phone call, the network communication manager 140 initiates display of one or more of the following call handling options: call forward to voicemail, call reject, call ignore, etc. In one embodiment, the network communication manager 140 does not display any call handling options but does display a notification that the do not disturb functionality can be selected.

Via input from the user 108 pressing one or more keypads on the control device 127 as specified by the call handling option 220-1, the user 108 can provide notification to the network communication manager 140 how to handle the incoming phone call associated with the visual prompt 145-1. For example, assume that user 108 provides input 105 to select the call handling option 220-1. In response to the selection, the network communication manager 140 receives a respective command inputted by the user 108 viewing the streaming content played back on the display screen.

The network communication manager 140 handles the call in accordance with the call handling option selected by the user 108. For example, selection of the call forwarding option can indicate to forward the incoming phone call to voice mail and terminate generation of an audio alert signal (on the phone device 115) associated with the incoming phone call. Based on this selection, in response to receiving selection of the call forwarding option by the user 108, the network communication manager 140 forwards the incoming phone call to voice mail and terminates or prevents generation of an audio alert signal associated with the incoming phone call. Accordingly, a subscriber can manage handling on an incoming call via input with respect to visual prompt 145-1 simultaneously displayed on a display screen 130 along with displayed streaming content 125.

Another call handling option displayed in the visual prompt 145-1 can be selected to reject the incoming phone call. In response to detecting selection of a call handling option such as a call reject option as displayed in the visual prompt 145-1, the network communication manager initiates termination of the currently received call. Termination of the currently received call can include initiating playback of a message to the caller that the callee (e.g., subscriber 108 being called) is not accepting calls at this time.

In accordance with another embodiment, if the call number appears to be from a telemarketer, the network communication manager inputs the caller into a blacklist to prevent future receipt of calls from the caller.

Another call handling option displayed in the visual prompt 145-1 can be selected to ignore the incoming phone call. The user 108 can select the call cancel option to perform no action with respect to the incoming phone call. As an example, selection of the displayed cancel option can indicate to discontinue displaying the visual notification of the incoming phone call and perform no specific call handling function with respect to the call. In other words, the network communication manager 140 allows the phone device 115 to ring as usual.

Another call handling option displayed in the visual prompt 145-1 can be selected to forward the incoming call to the subscriber to a phone device other than phone device 115. For example, the subscriber or user 108 can be notified of an incoming call alert to the phone device 115. The phone device 115 may be a home phone. The subscriber may be viewing content on display screen 130 at a remote location with respect to his/her home and home phone. For example, the user 108 may be viewing streaming content 125 on display screen 130 while in a coffee shop. In such an instance, the visual prompt 145-1 provides notification of the incoming call to the user 108. The user 108 can select the appropriate call forwarding option on the display screen 130 to forward the incoming call to the user's mobile device instead of the phone device 115. A call manager receives the call forwarding notification and initiates forwarding of the incoming call to the alternate phone device as specified by the user 108 through the display screen 130. Based on forwarding of the call, the user 108 can answer the incoming call in the coffee on their mobile phone.

Note that any suitable call handling option can be displayed in the visual prompt 145-1 to notify a respective viewer of the different call handling options that can be applied to a currently received phone call.

In certain embodiments, no call handling options are displayed in the visual prompt 145-1.

In accordance with another embodiment, when the visual prompt 145-1 includes a visual indication that the do not disturb mode can be temporarily activated, in response to selection of the control option 220-2, the user 108 notifies the network communication manager 140 to at least temporarily prevent display of subsequent call alert notifications on the display screen 130. As mentioned, the do not disturb functionality can be automatically deactivated without further input from the subscriber 108 in response to a respective trigger condition such as termination of playing back the streaming content 125, expiry of a timer set by the user 108, etc.

Figure 3:
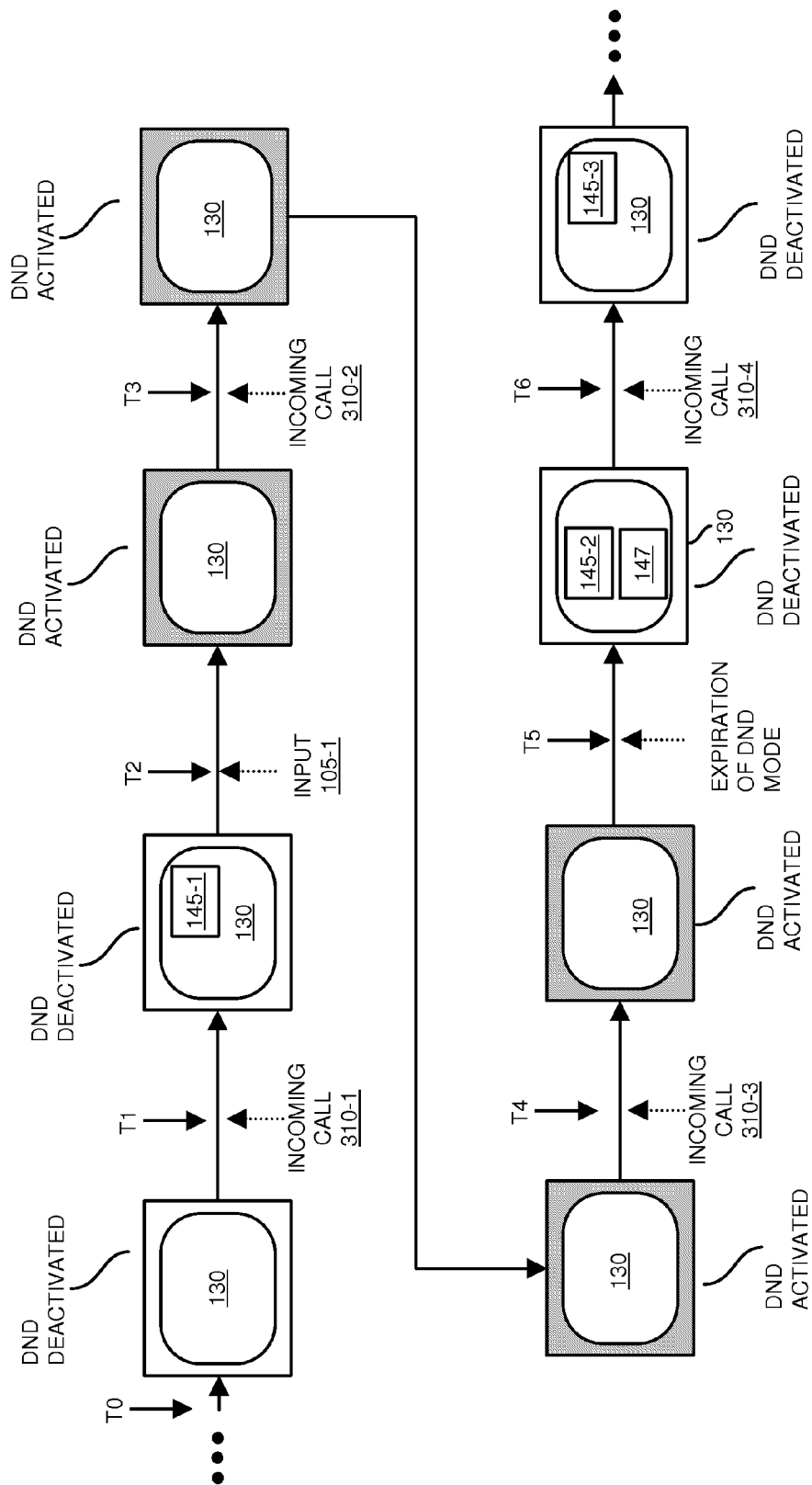
FIG. 3 is an example diagram illustrating of a timeline of events with respect to playback of content on a display screen according to embodiments herein.

FIG. 3 is an example diagram illustrating a time sequence of watching streaming content during which do not disturb functionality is temporarily activated according to embodiments herein.

In this example embodiment, at time T0, assume that the user 108 initiates playback of selected streaming content 125 on the display screen 130. Further assume that the caller identifier functionality is initially enabled.

At time T1, the user 108 receives an incoming call on phone device 115. The do not disturb functionality is initially disabled. The notification mode is enabled. The network communication manager 140 initiates display of the visual prompt 145-1 on the display screen 130 to notify the user 108 of the incoming call and that the do not disturb functionality can be selected to temporarily prevent display of future call alert notifications.

Assume, at time T2, that the user 108 provides input 105-1 to temporarily activate the do not disturb mode. The network communication manager continues playback of the streaming content on display screen 130.

As mentioned, the network communication manager 140 can estimate a duration of time in which to activate the do not disturb in a number of different ways. For example, the network communication manager can receive a time value from the user 108; the network communication manager 140 can be configured to analyze attributes of the streaming content 125 to determine an expiry time; the network communication manager 140 can be configured to access a television program guide to determine an expected end time of playing back the streaming content; and so on.

As discussed below, during activation of the do not disturb mode, the network communication manager 140 prevents display of subsequent visual call alert notifications on the display screen 130 while the do not disturb functionality is disabled. Accordingly, the viewer is not disturbed via playback of the content.

For example, at time T3, while playing back streaming content 125, the user 108 receives incoming call 310-2 directed to phone device 115. In response to detecting the incoming phone call 310-2, and that the do not disturb functionality is temporarily activated, the network communication manager 140 prevents display of a respective visual prompt 145 on the display screen 130 over a rendition of selected streaming content that is played back. As mentioned, the network communication manager 140 can prevent the phone device 115 from ringing as well by forwarding the call to voice mail or playing back a suitable message indicating that the user 108 is not currently accepting calls. The network communication manager 140 logs the call by recording the caller identifier information associated with call 310-2.

At time T4, while playing back streaming content 125, the user 108 receives incoming call 310-3 directed to phone device 115. In response to detecting the incoming phone call 310-3, and that the do not disturb functionality is still activated, the network communication manager 140 prevents display of a respective visual prompt 145 on the display screen 130. As mentioned, the network communication manager 140 can prevent the phone device 115 from ringing as well by forwarding the call to voice mail or playing back a suitable message indicating that the user 108 is not currently accepting calls. The network communication manager 140 logs the call 310-3 by recording the caller identifier information associated with call 310-2.

Accordingly, via activation of do not disturb functionality, the user 108 can watch the streaming content 125 without being disturbed.

In furtherance of the present example, at time T5, the do not disturb functionality is deactivated. As previously discussed, the do not disturb is automatically deactivated by the network communication manager 140 in response to a trigger condition such as expiry of a timer, termination of displaying the streaming content 125, completion of the displaying the streaming content 125, etc.

In one embodiment, in response to expiration of the do not disturb mode, the network communication manager 140 initiates display of visual prompt 145-2 on the display screen 130. An example of visual prompt 145-2 is shown and discussed with respect to FIG. 4. Visual prompt 145-2 enables the user 108 to view call log information of the one or more blocked calls received during playback of the streaming content 125 while the do not disturb functionality was enabled.

Referring again to FIG. 3, at time T6, the network communication manager detects incoming call 310-3. Because the temporary do not disturb functionality is no longer activated, the network communication manager initiates display of visual prompt 145-3 on display screen 130. Visual prompt 145-3 can be similar to the visual prompt 145-1 as previously discussed. For example, visual prompt 145-3 can include caller ID information associated with the caller initiating the incoming call 310-3 as well as indicate call handling options and/or that the do not disturb function can be enabled.

Figure 4:
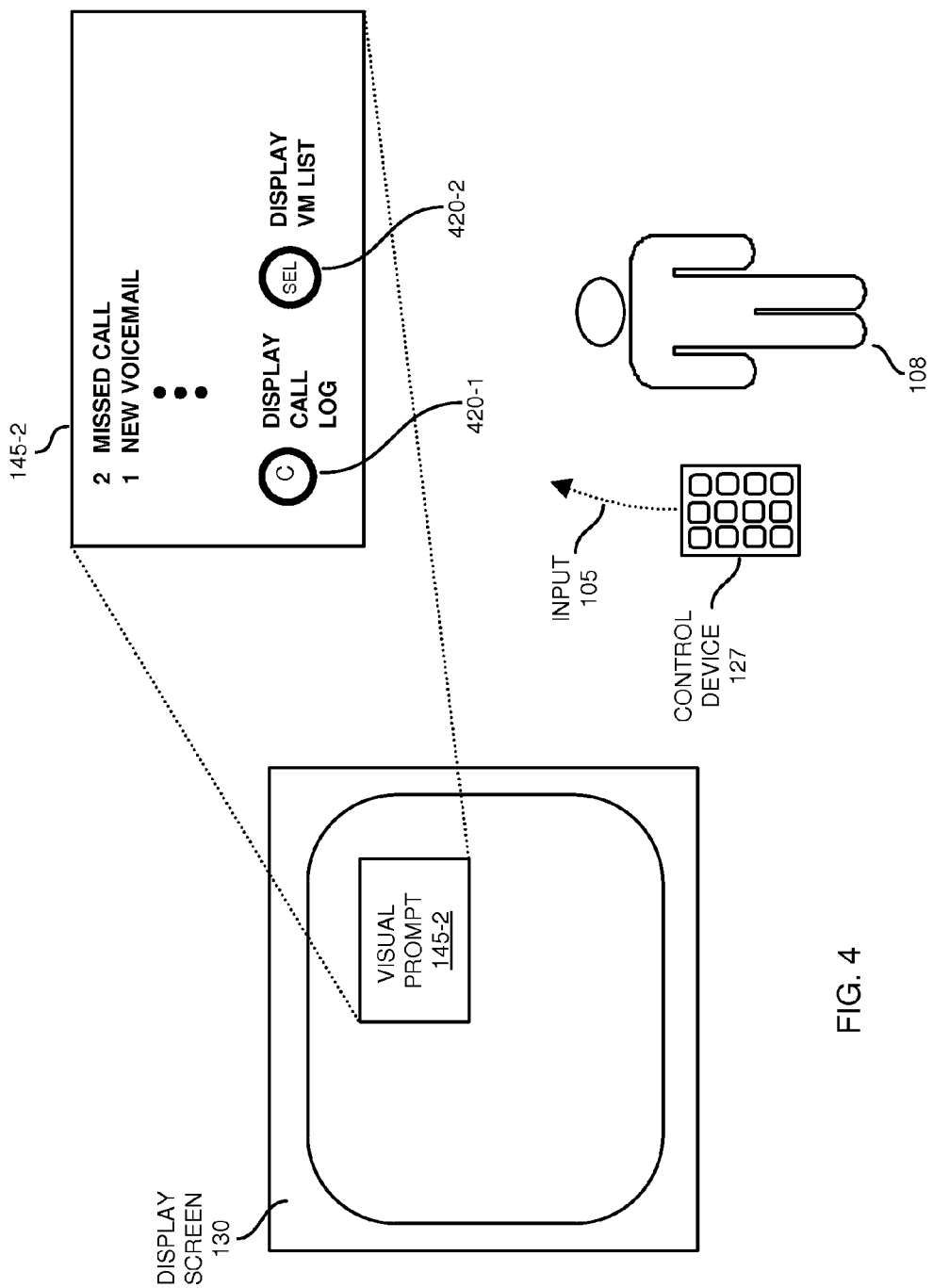
FIG. 4 is an example diagram illustrating display of a visual prompt according to embodiments herein.

FIG. 4 is an example diagram illustrating display of a visual prompt upon deactivation of a temporary do not disturb according to embodiments herein.

As previously mentioned, the network communication manager 140 can be configured to store log information indicating the occurrence of the received phone calls during the playback of the streaming content on the display screen. In response to a trigger condition such as detecting termination of playing back the streaming content on the display screen, the network communication manager 140 initiates display of a visual prompt 145-2 on the display screen 130 to notify the user 108 regarding availability of the log information 147 to view details of the received phone calls.

More specifically, in one embodiment, visual prompt 145-2 indicates that there were two missed calls (e.g., incoming call 310-1 and incoming call 310-2) during a time when the do not disturb mode was activated. Visual prompt 145-2 initiates display of control option 420-1 and control option 420-2.

Selection of the control option 420-1 via appropriate input from the user 108 causes the network communication manager 140 to initiate display of a call log on the display screen 130. The call log information 147 can include information for each call such as a name of a respective caller, a number of a respective caller, a time when the respective caller made the call, a number dialed by the respective caller to reach the user 108, etc.

Selection of the control option 420-2 via appropriate input from the user causes the network communication manager 140 to initiate display of a voice mail list on the display screen 130. In one embodiment, the voice mail list includes information associated with each caller that leaves a respective voice message. The voice mail list can include information about callers leaving a respective voice mail such as a name of a respective caller leaving the voice mail, a number of a respective caller leaving the voice mail, a time when the respective caller made the call, a number dialed by the respective caller to reach the user 108, etc.

Figure 5:
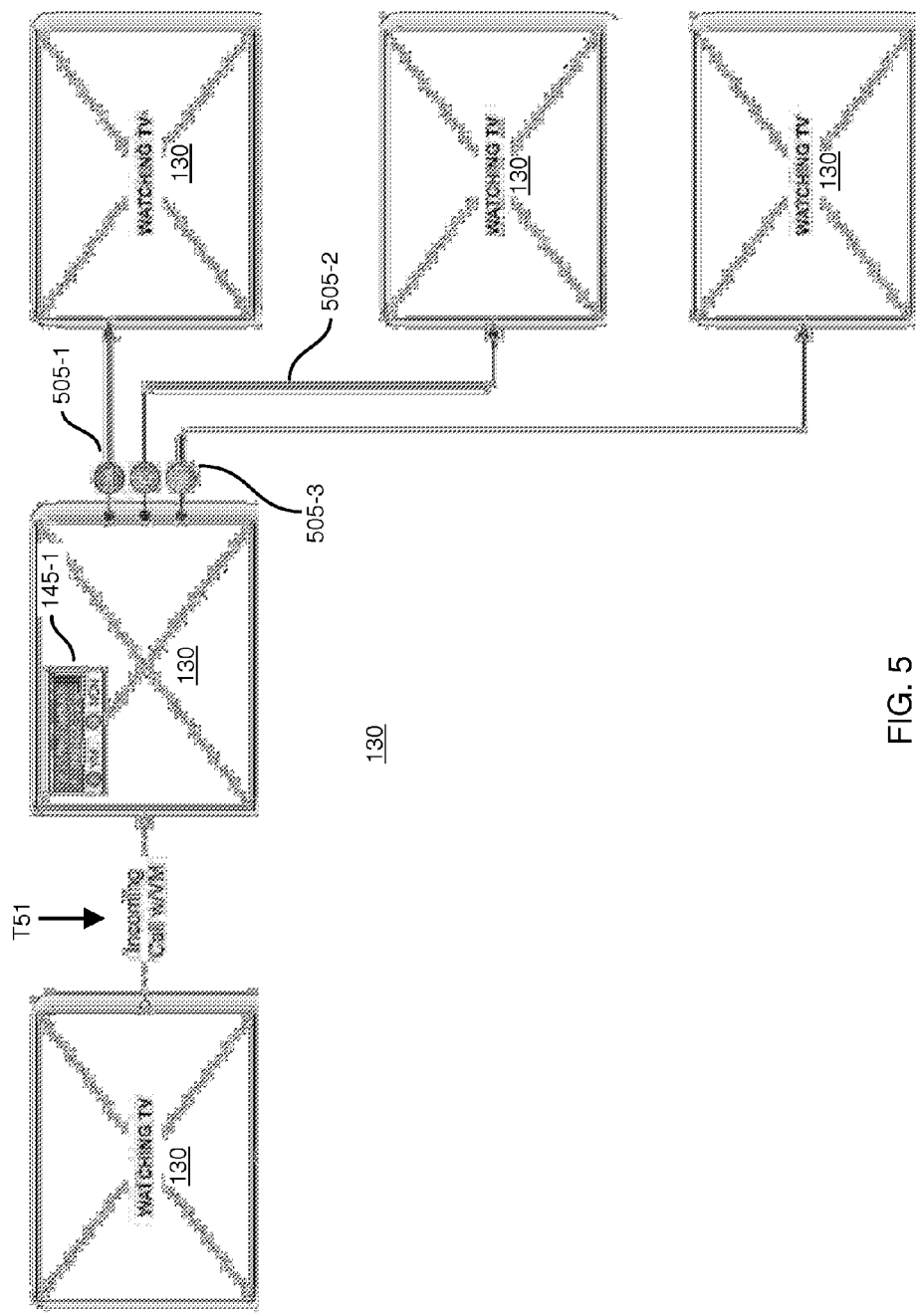
FIG. 5 is an example diagram illustrating actions resulting from selection of different modes according to embodiments herein.

FIG. 5 is an example diagram illustrating actions resulting from selection of different control modes according to embodiments herein.

As previously discussed, the user 108 can select and display selected content on display screen 130. At time T51, assume the user 108 receives an incoming call and also subscribes to a voice mail option. In such an instance, the network communication manager 140 initiates display of the visual prompt 145-1.

The user 108 can provide different types of input 505 with respect to the visual prompt 145-1.

For example, in response to receiving input 505-1 (e.g., selection of VM in the visual prompt 145-1), the network communication manager 140 discontinues display of the visual prompt 505-1, terminates ringing of the phone device 115, and the caller is sent to the user's voice mail account.

In response to receiving input 505-2 (e.g., selection of the do not disturb functionality as discussed herein), the network communication manager 140 discontinues display of the visual prompt 505-2, terminates ringing of the phone device 115, the caller is sent to the user's voice mail account, and do not disturb functionality is temporarily activated.

In response to receiving input 505-3 (e.g., selection of cancel), the network communication manager 140 discontinues display of the visual prompt 505-3 and enables the phone device 115 to continue ringing. If the user 108 does not answer the phone device 115, the call may be forwarded to voice mail. In each case, the subscriber 108 can continue to view a rendition of the streaming content displayed on the display screen 130 after providing different types of input 505.

Figure 6:
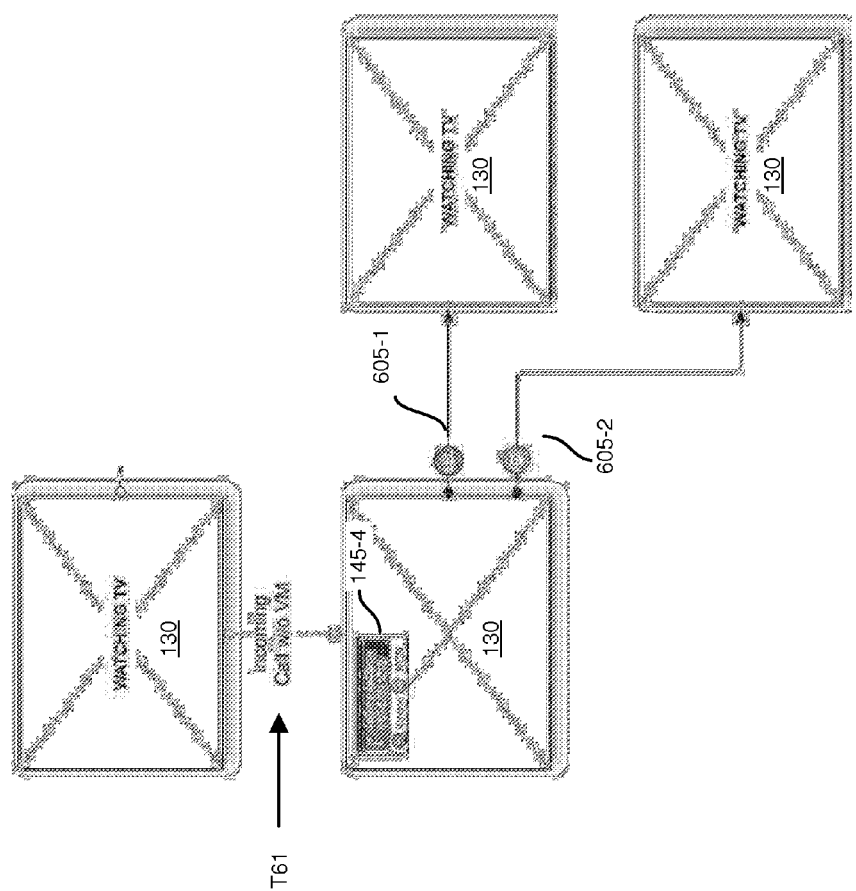
FIG. 6 is an example diagram illustrating actions resulting from selection of different modes according to embodiments herein.

FIG. 6 is an example diagram illustrating actions resulting from selection of different modes according to embodiments herein.

As previously discussed, the user 108 can select and display content on display screen 130. Assume in this example that the user 108 does not subscribe to voice mail that is managed by network communication manager 140.

At time T61, assume the user 108 receives an incoming call. In such an instance, the network communication manager 140 initiates display of the visual prompt 145-4.

The user 108 can provide different types of input 605 with respect to the visual prompt 145-4.

In response to receiving input 605-1 (e.g., selection of IGNORE in the visual prompt 145-4) via receipt of appropriate input, the network communication manager 140 discontinues display of the visual prompt 145-4, terminates ringing of the phone device 115, and terminates the call.

In response to receiving input 605-2 (e.g., selection of the do not disturb functionality or as discussed herein), the network communication manager 140 discontinues display of the visual prompt 145-4, terminates ringing of the phone device 115, and the do not disturb functionality is temporarily activated.

Figure 7:
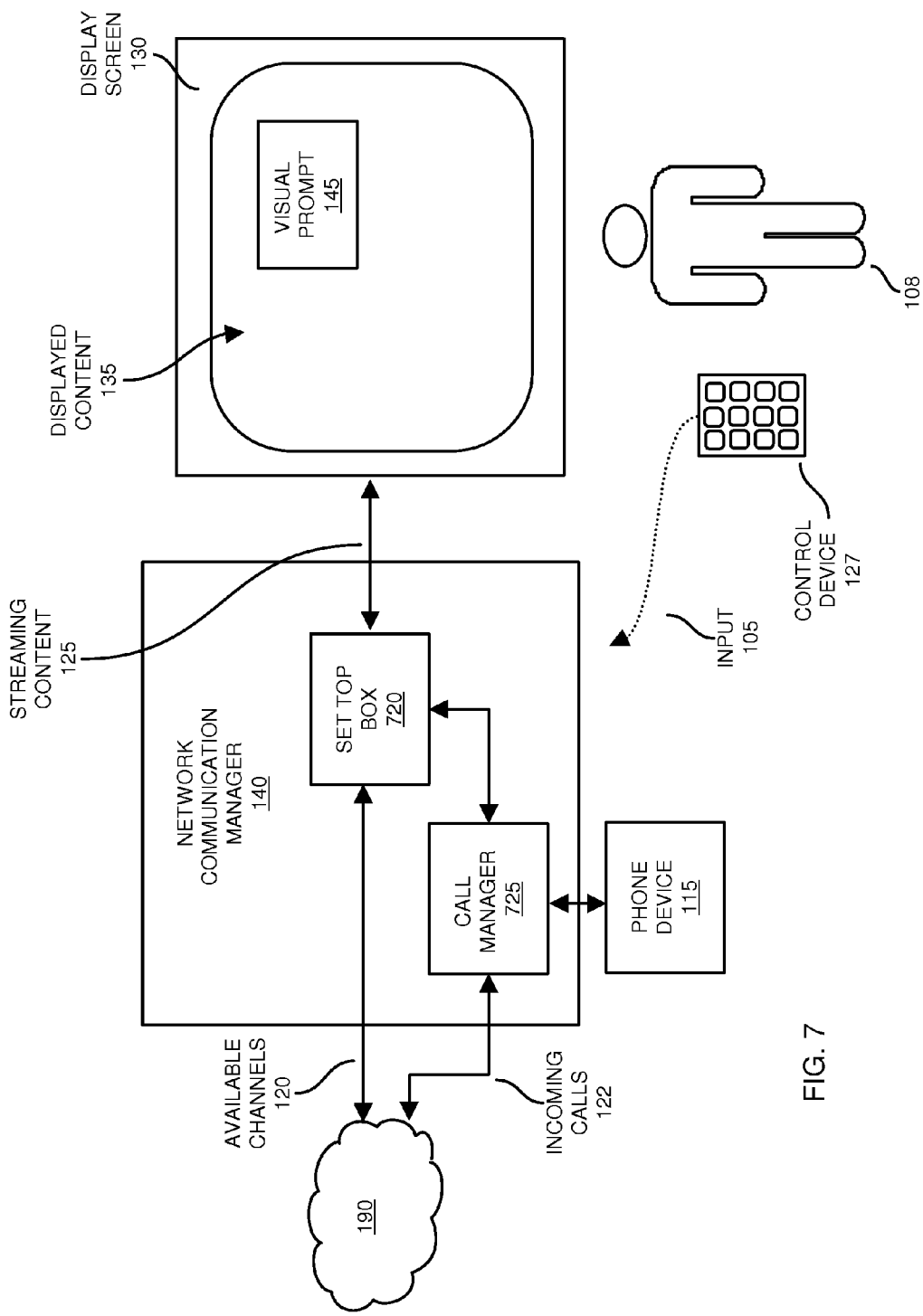
FIG. 7 is an example diagram illustrating a network environment including a call manager and a set-top box according to embodiments herein.

FIG. 7 is an example diagram illustrating a network environment according to embodiments herein.

As shown, network communication manager 140 includes call manager 725 and set-top box 720. Via input from a resource such as a control device 127, the user 108 provides input to set-top box 720 to select streaming content that is to be played back on display screen 130. The control device 127 can be a wireless remote controller configured to provide input 105 to either of both the display screen 130 and the set-top box 720.

Call manager 725 can be a separately located device with respect to set-top box 725.

As its name suggests, during operation, the call manager 725 manages incoming calls and provides connectivity between network 190 and phone device 115 enabling the user 108 to communicate with another party operating a remote communication device (e.g., a phone) with respect to the user 108.

In this example embodiment, the call manager 725 receives incoming calls directed to the user 108. In response to detecting receipt of an incoming phone call, the call manager forwards the caller identifier information (and possible other relevant metadata) to the set-top box 720. Assuming the do not disturb functionality is deactivated, in a manner as previously discussed, the set-top box 720 produces a respective visual prompt 145 to notify the user 108 of the incoming call. The visual prompt 145 can display information about the call as well as that the do not disturb functionality can be activated.

Assume the user 108 would like to activate the do not disturb functionality. In one embodiment, the user utilizes the control device 127 to provide input to the set-top box 720 and activate the do not disturb mode as discussed herein.

In this example embodiment, upon receiving a respective command (e.g., based on the user 108 providing input via control device 127) to activate the do not disturb during playback of particular streaming content, the set-top box 720 produces a timer value indicating a length of time in which the do not disturb functionality is to be activated. The set-top box 720 can produce the timer value in a number of different ways. For example, as discussed above, the user 108 can specify an amount of time in which to activate the do not disturb functionality, the set-top box 720 can calculate a value in which to set the do not disturb functionality based on attributes of the particular streaming content currently being displayed on the display screen 130, etc.

The set-top box 720 forwards the produced timer value to notify the call manager 725 that the do not disturb functionality has been activated. For a duration of time as specified by the timer value, the call manager 725 tags any notifications (forwarded from the call manager 725 to the set-top box 720) to indicate which incoming calls were received during activation of the do not disturb mode. For example, assume the call manager 725 receives an incoming call directed to the user 108 while the do not disturb functionality is activated (e.g., before the timer value has not timed out). The call manager 725 tags and then forwards the relevant caller identifier information to the set-top box 720. The call manager 725 handles the incoming call in accordance with the do not disturb mode. For example, because the do not disturb mode is activated, the call manager 725 temporarily prevents the phone device 115 from ringing and forward the call to voice mail.

The set-top box 720 receives the tagged information forwarded by the call manager 725. Since the forwarded call information is tagged with a do not disturb tag, the set-top box 720 prevents a visual prompt 145 from immediately being displayed on the display screen 130.

As mentioned, the set-top box 720 can be configured to produce a log including the tagged call information. Subsequent to expiry of the temporarily activated do not disturb mode, in a manner as previously discussed, the set-top box initiates notification to the user 108 on the display screen 130 of the log or that the log information 147 of calls is available for viewing on display screen 130.

As an alternative to forwarding a timer value to the call manager 725, note that the set-top box 720 can keep track of when the network communication manager 140 is in the do not disturb mode and merely provide notifications to the call manager 725 when the network communication manager 140 is in such a mode. Accordingly, the call manager 725 can be apprised of how to handle incoming calls 122.

Figure 8:
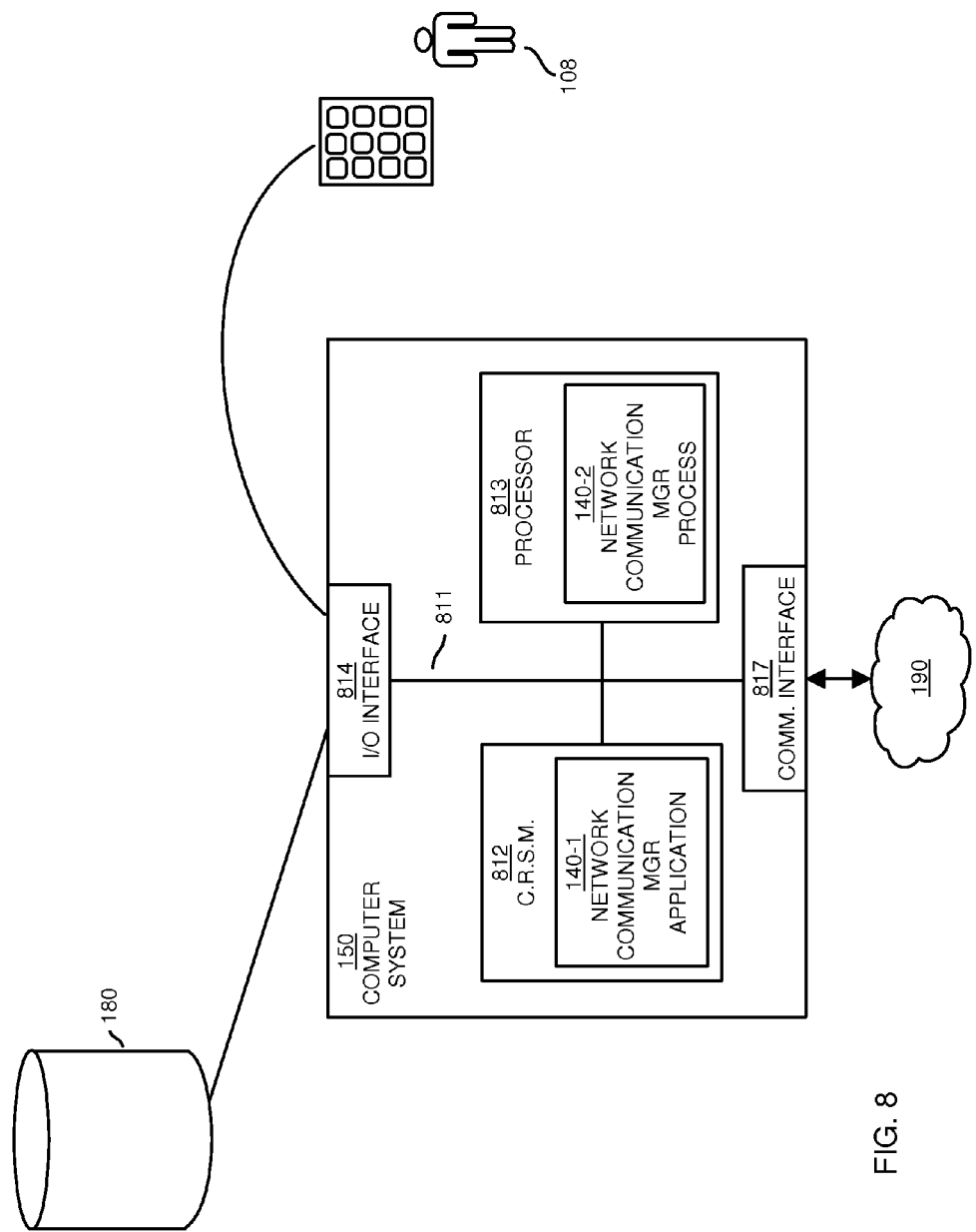
FIG. 8 is a diagram illustrating example hardware including a processor and an encoded hardware storage medium to execute according to embodiments herein.

FIG. 8 is an example block diagram of a computer system 150 for implementing any of the operations according to embodiments herein.

As shown, computer system 150 of the present example can include an interconnect 811 that couples computer readable storage media 812 such as a non-transitory type of media (i.e., any type of hardware storage medium but not a radio frequency signal) in which digital information can be stored and retrieved, a processor 813, I/O interface 814, and a communications interface 817.

I/O interface 814 provides connectivity to a repository 180 and, if present, other devices such as display screen, keypad, a computer mouse, etc.

Computer readable storage media 812 can be any non-transitory storage device such as memory, optical storage, hard drive, floppy disk, etc. In one embodiment, the computer readable storage media 812 stores instructions and/or data.

Communications interface 817 enables the computer system 150 and processor 813 to communicate over a resource such as network 190 to retrieve information from remote sources and communicate with other computers. Depending on the embodiment, any or all of the functionality associated with the installation manager 140 can be performed locally by processor 813, or via resources in network 190, or a combination of both.

I/O interface 814 enables processor 813 to retrieve or attempt retrieval of stored information from repository 180.

As shown, computer readable storage media 812 is encoded with network communication manager application 140-1 (e.g., software, firmware, etc.) executed by processor 813. Network communication manager application 140-1 can be configured to include instructions to implement any of the operations associated with network communication manager application 140 as previously discussed.

During operation of one embodiment, processor 813 accesses computer readable storage media 812 via the use of interconnect 811 in order to launch, run, execute, interpret or otherwise perform the instructions in network communication manager application 140-1 stored on computer readable storage media 812.

Execution of the network communication manager application 140-1 produces processing functionality such as network communication manager process 140-2 in processor 813. In other words, the network communication manager process 140-2 associated with processor 813 represents one or more aspects of executing network communication manager application 140-1 within or upon the processor 813 in the computer system 150.

Those skilled in the art will understand that the computer system 150 can include other processes and/or software and hardware components, such as an operating system that controls allocation and use of hardware resources to execute network communication manager application 140-1.

In accordance with different embodiments, note that computer system may be any of various types of devices, including, but not limited to, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 150 may reside or be moved to any location in network environment 100.

Functionality supported by the network communication manager 140 will now be discussed via flowcharts in FIGS. 15-17. Note that the steps in the flowcharts below can be executed in any suitable order.

Figure 9:
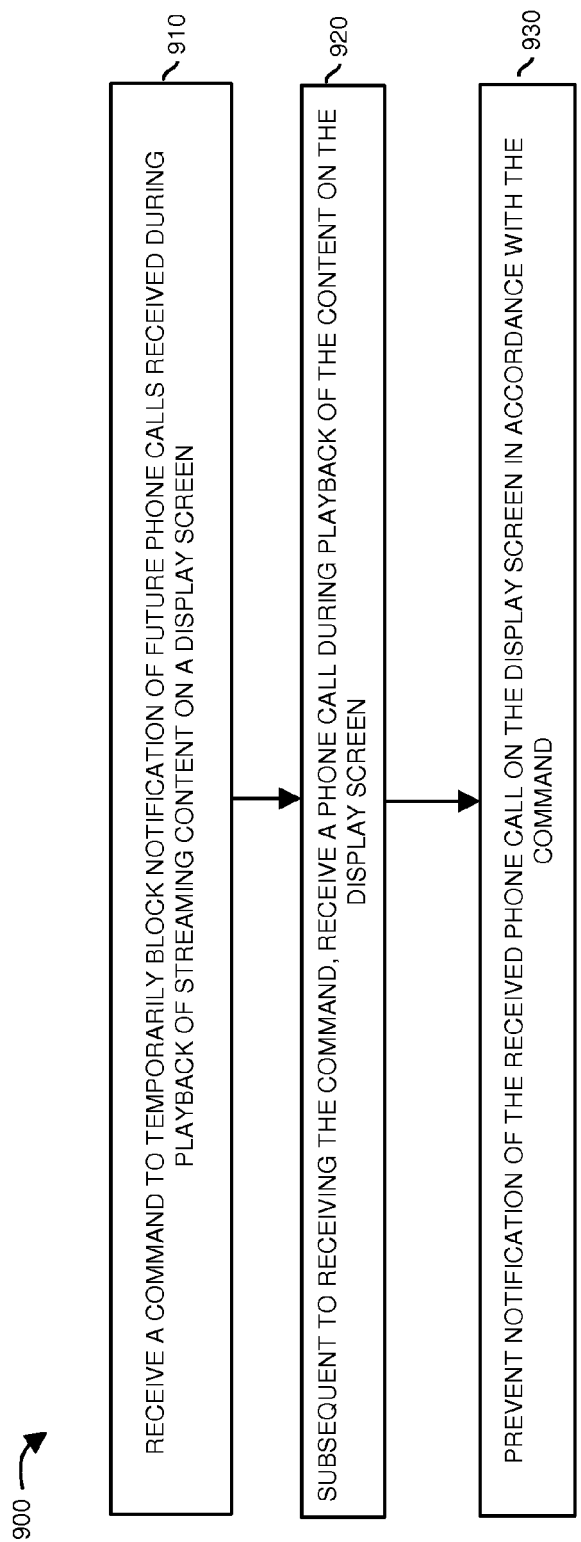
FIGS. 9-11 are flowcharts illustrating example methods according to embodiments herein.

FIG. 9 is a flowchart 900 illustrating an example method according to embodiments herein. Note that there will be some overlap with respect to concepts as discussed above.

In step 910, the network communication manager 140 receives a command to temporarily block notification of future phone calls received during playback of streaming content 125 on a display screen 130.

In step 920, subsequent to receiving the command from resource such as user 108, the network communication manager 140 receives a notification of an incoming phone call during playback of the streaming content 125 on the display screen 130.

In step 930, the network communication manager 140 prevents notification of the incoming phone call on the display screen 130 in accordance with the command.

Figure 10:
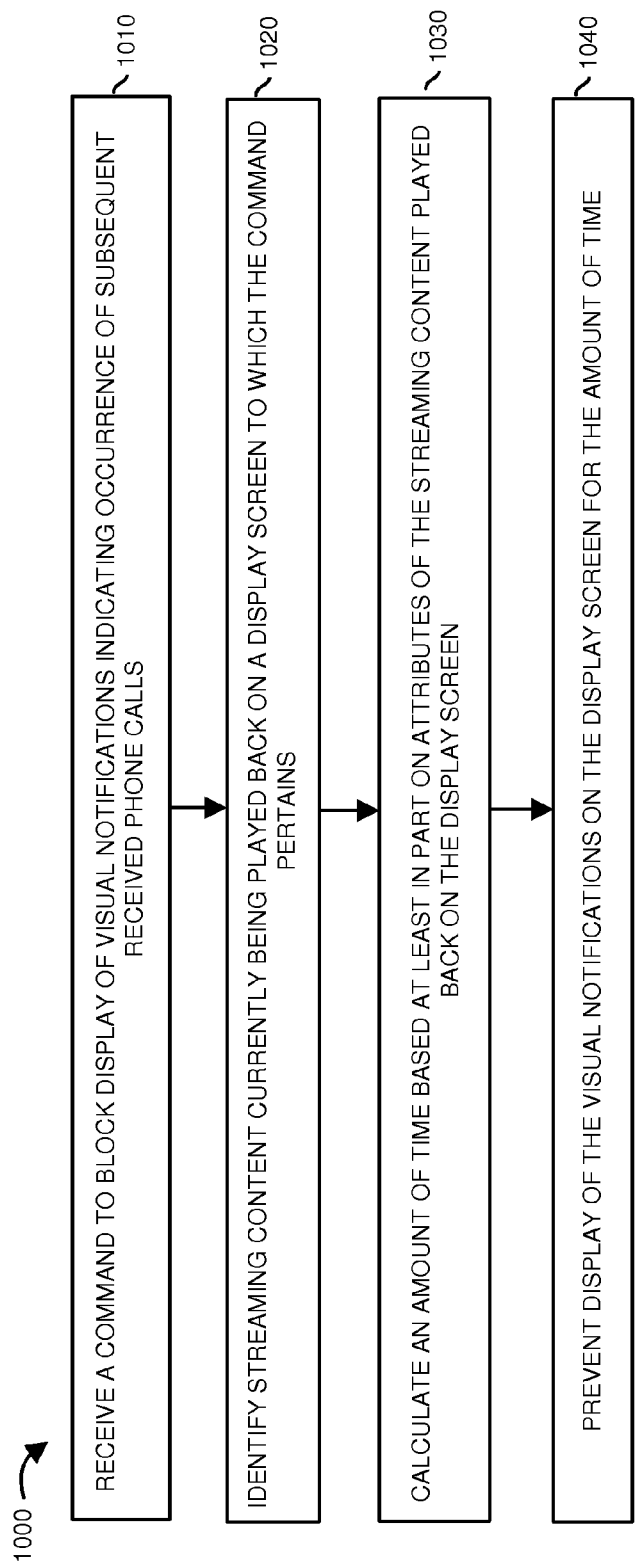

FIG. 10 is a flowchart 1000 illustrating an example method according to embodiments herein. Note that there will be some overlap with respect to concepts as discussed above.

In step 1010, the network communication manager 140 receives a command to block display of visual notifications (e.g., one or more visual prompts) indicating occurrence of subsequent received phone calls.

In step 1020, the network communication manager 140 identifies streaming content 125 currently being played back on the display screen 130 to which the command (e.g., do not disturb command) pertains.

In step 1030, the network communication manager 140 calculates an amount of time based at least in part on attributes of the streaming content 125 played back on the display screen 130.

In step 1040, the network communication manager 140 prevents display of the visual notifications (e.g., one or more visual prompts) on the display screen 130 for the amount of time.

Figure 11:
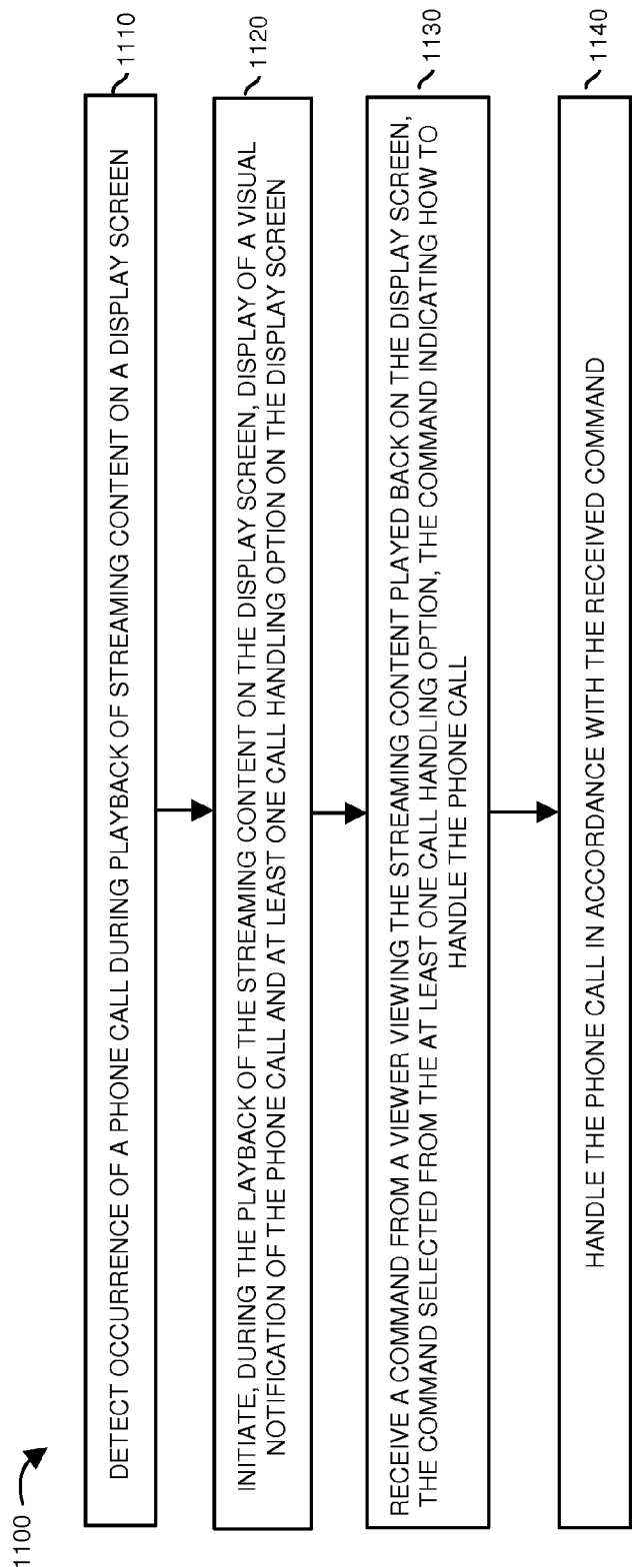

FIG. 11 is a flowchart 1100 illustrating an example method according to embodiments herein. Note that there will be some overlap with respect to concepts as discussed above.

In step 1110, the network communication manager 140 detects occurrence of a phone call during playback of streaming content 125 on the display screen 130.

In step 1120, the network communication manager 140 initiates, during the playback of the streaming content 125 on the display screen 130, display of a visual notification (e.g., a visual prompt) of the phone call and notification of at least one selectable call handling option on the display screen 130.

In step 1130, the network communication manager 140 receives a command from a viewer (e.g., user 108) viewing the streaming content 125 played back on the display screen 130. The command inputted by the user 108 can be selected from the at least one call handling option in a visual prompt. The command received from the user 108 indicates how to handle the received phone call.

In step 1140, the network communication manager 140 handles the phone call in accordance with the command received from the user 108.

Note again that techniques herein are well suited for managing call notifications, handling calls, etc. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   initiating display of a visual prompt on a display screen to a viewer, the visual prompt overlaid on a rendition of video content currently played back on the display screen, the visual prompt including a message that the viewer can select a do not disturb mode to block notification of future calls to the viewer;
   receiving a command responding to the visual prompt, the command selecting the do not disturb mode to temporarily block notification of the future calls to the viewer that are received during playback of the video content on the display screen;
   subsequent to receiving the command, receiving notice of an incoming call to the viewer during playback of the video content on the display screen; and
   preventing notification of the incoming call from being displayed on the display screen in accordance with the command; and
   wherein initiating display of the visual prompt includes:
   initiating display of the visual prompt on the display screen in response to detecting receipt of an incoming call alert to the viewer during playback of the video content on the display screen, the incoming call alert received prior to receiving the command selecting the do not disturb mode to block notification of future calls.

2. The method as in claim 1 further comprising:
receiving input specifying a duration of time to block the notification of the future calls; and
preventing notification of the future calls for at least the duration of time as specified by the input.

3. The method as in claim 1 further comprising:
analyzing attributes of the video content to estimate a duration of time associated with the video content;
initiating activation of a do not disturb function to temporarily prevent notification of the future calls on the display screen for the estimated duration of time to provide undisturbed playback of the video content on the display screen; and
automatically initiating deactivation of the do not disturb function in response to expiration of the duration of time.

4. The method as in claim 1, wherein preventing notification of the incoming call further includes:
preventing a phone device from generating an audible alert during playback of the video content on the display screen, the phone device being disparately located with respect to the display screen.

5. The method as in claim 1, wherein preventing notification of the incoming call includes:
prior to completing playback of the video content on the display screen, preventing display of a pop-up text message on the display screen indicating occurrence of the incoming call.

6. The method as in claim 1 further comprising:
storing log information indicating occurrence of the incoming call, the log information including a unique name and callback information of a caller initiating the incoming call during the playback of the video content on the display screen.

7. The method as in claim 6 further comprising:
in response to detecting termination of playing back the video content on the display screen, initiating display of a visual notification on the display screen to notify a viewer about availability of the log information; and
in response to receiving a command from the viewer to display the log information, initiating display of the log information on the display screen, the displayed log information including unique identifier information associated with a party initiating the incoming call.

8. The method as in claim 6 further comprising:
in response to detecting termination of playing back the video content on the display screen, initiating display of the log information on the display screen, the displayed log information including the unique name and the callback information of the caller.

9. The method as in claim 1 further comprising:
displaying, in the visual prompt, a unique identifier value specifying an identity of a calling party attempting communications with the viewer during playback of the video content on the display screen; and
discontinuing display of the visual prompt in response to receiving the command.

10. The method as in claim 1 further comprising:
notifying a call manager that the do not disturb mode to block notification has been selected, the call manager handling the incoming call to the viewer, the call manager tagging the incoming call with a tag indicating that the incoming call was received while the do not disturb mode is activated;
receiving a message from the call manager, the message including the tagged incoming call; and
in accordance with the command, preventing notification of the incoming call to the viewer because the incoming call has been tagged by the call manager.

11. A method comprising:
initiating display of a visual prompt on a display screen in response to detecting receipt of an incoming call alert to a user during playback of video content on the display screen, the visual prompt providing notice of a do not disturb mode to block notification of future calls to the user;
as a response to the visual prompt, receiving a command from the user viewing playback of a rendition of the video content played back on the display screen, the user inputting the command to select the do not disturb mode, the command indicating to block display of visual notifications on the display screen indicating occurrence of subsequent received calls to the user;
identifying video content currently being played back on the display screen to which the command pertains;
calculating an amount of time based at least in part on attributes of the video content played back on the display screen; and
preventing display of the visual notifications on the display screen for the amount of time.

12. The method as in claim 11 further comprising:
subsequent to expiry of the calculated time, reverting back to a mode of initiating display of call alert notifications on the display screen in response to reception of respective calls.

13. The method as in claim 11, wherein calculating the amount of time includes:
accessing a television program guide to determine an end time of playing back the video content; and
utilizing the television program guide as a basis in which to calculate the amount of time to complete playback of the video content on the display screen.

14. The method as in claim 11 further comprising:
preventing audible call alert notifications from being generated on a communication device for the calculated amount of time, the communication device being a disparately located device with respect to the display screen.

15. The method as in claim 11 further comprising:
storing log information indicating the occurrence of the received calls during the playback of the video content on the display screen.

16. The method as in claim 15 further comprising:
in response to detecting termination of playing back the video content on the display screen, initiating display of a visual notification on the display screen to notify a viewer regarding availability of the log information to view details of the subsequent received calls.

17. The method as in claim 11 further comprising:
displaying, in the visual prompt, multiple call handling options;
a first call handling option displayed in the visual prompt including the message that the viewer can select the do not disturb mode to block notification of future calls to the viewer;
a second call handling option displayed in the visual prompt providing the viewer a selectable option of handling the incoming call alert as an alternative to the do not disturb mode to block notification of future calls to the viewer.

18. A method comprising:

initiating display of a visual prompt on a display screen to a viewer, the visual prompt overlaid on a rendition of video content currently played back on the display screen, the visual prompt including a message that the viewer can select a do not disturb mode to block notification of future calls to the viewer;

receiving a command to block display of visual notifications indicating occurrence of subsequent received calls;

identifying video content currently being played back on a display screen to which the command pertains;

calculating an amount of time based at least in part on attributes of the video content played back on the display screen;

preventing display of the visual notifications on the display screen for the amount of time; and wherein calculating the amount of time includes: identifying the amount of time to complete playback of the video content on the display screen based on a current playback point in the video content.

19. A system comprising:

at least one processor device; and a hardware storage resource coupled to the at least one processor device, the hardware storage resource storing instructions that, when executed by the at least one processor device, cause the at least one processor device to perform the operations of:

initiating display of a visual prompt on a display screen to a viewer, the visual prompt overlaid on a rendition of video content currently played back on the display screen, the visual prompt including a message that the viewer can select a do not disturb mode to block notification of future calls to the viewer;

receiving a command selecting the do not disturb mode to temporarily block notification of the future calls to the viewer that are received during playback of the video content on the display screen;

subsequent to receiving the command, receiving a call during playback of the video content on the display screen;

preventing notification of the received call from being displayed on the display screen in accordance with the command; and wherein initiating display of the visual prompt includes: initiating display of the visual prompt on the display screen in response to detecting receipt of an incoming call alert to the viewer during playback of the video content on the display screen, the incoming call alert received prior to receiving the command selecting the do not disturb mode to block notification of future calls.

20. The system as in claim 19, wherein the at least one processor device further performs operations of:

analyzing attributes of the video content to estimate a duration of time;

initiating activation of a do not disturb function to temporarily prevent notification of the future calls for the estimated duration of time to provide undisturbed playback of the video content on the display screen; and automatically initiating deactivation of the do not disturb function in response to expiration of the duration of time.

21. The system as in claim 19, wherein preventing notification of the received call further includes:

preventing a phone device from generating an audible alert during playback of the video content on the display screen, the phone device being disparately located with respect to the display screen.

22. The system as in claim 19, wherein the at least one processor device further performs operations of:

storing log information indicating occurrence of the received call, the log information including a unique name and callback information of a caller initiating the call during the playback of the video content on the display screen.

23. The system as in claim 22, wherein the at least one processor device further performs operations of:

in response to detecting termination of playing back the video content on the display screen, initiating display of a visual notification on the display screen to notify a viewer about availability of the log information; and in response to receiving a command from the viewer to display the log information, initiating display of the log information on the display screen, the displayed log information including unique identifier information associated with a party initiating the call.

* * * * *